United States Patent
Norizuki et al.

(10) Patent No.: US 7,366,410 B2
(45) Date of Patent: Apr. 29, 2008

(54) SIGNAL RELAY APPARATUS OF OPTICAL COMMUNICATION SYSTEM

(75) Inventors: Akira Norizuki, Shizuoka-ken (JP); Yoshikazu Saito, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 616 days.

(21) Appl. No.: 10/514,131

(22) PCT Filed: Feb. 27, 2004

(86) PCT No.: PCT/JP2004/002450
§ 371 (c)(1),
(2), (4) Date: Nov. 12, 2004

(87) PCT Pub. No.: WO2004/077703
PCT Pub. Date: Sep. 10, 2004

(65) Prior Publication Data
US 2005/0152692 A1 Jul. 14, 2005

(30) Foreign Application Priority Data
Feb. 28, 2003 (JP) ............................. 2003-054599

(51) Int. Cl.
*H04B 10/00* (2006.01)
(52) U.S. Cl. ............................. 398/3; 398/59
(58) Field of Classification Search ............... 398/3, 398/4, 59, 90, 167, 171, 2
See application file for complete search history.

(56) References Cited

U.S. PATENT DOCUMENTS 4,663,748 A 5/1987 Karbowiak et al.
5,745,027 A 4/1998 Malville
6,501,574 B1 12/2002 Unno et al.
6,647,174 B2 * 11/2003 Gooding et al. ............... 385/18

(Continued)

FOREIGN PATENT DOCUMENTS

JP        03-108839        5/1991

(Continued)

OTHER PUBLICATIONS

Japanese Official Action issued on Jul. 4, 2006, by the Japanese Patent Office.

*Primary Examiner*—Christina Leung
(74) *Attorney, Agent, or Firm*—Finnegan, Henderson, Farabow, Garrett & Dunner, LLP

(57) ABSTRACT

The signal relay apparatus has a plurality of photoelectric converters which convert an optical signal input from an electronic equipment (A-C) into an electric signal and outputs the same to the photoelectric converter (21-24), and which converts an electric signal input from another photoelectric converter and outputs the same to the corresponding electronic equipment; a plurality of switch circuits (31-34) which are provided at input and output ends of the electric signal of the photoelectric converter (21-23) and which are opened and closed to bypass the electric signal; and a power source supply section (41-43) which supplies a power source to the electronic equipment connected to the photoelectric converter. In a first J/B (11) and a second J/B (12), when any one of the electronic equipments connected to the photoelectric converters is not used, the electronic equipment (A-C) is bypassed by the switch circuit, and the power source supply section stops the supply of a power source to the electronic equipment (A-C).

4 Claims, 4 Drawing Sheets

U.S. PATENT DOCUMENTS 6,678,839 B2 * 1/2004 Mori .......................... 714/44

FOREIGN PATENT DOCUMENTS

| JP | 08-163030 | 6/1996 |
| JP | 08-213941 | 8/1996 |
| JP | 11-052260 | 2/1999 |
| JP | 2000-059409 | 2/2000 |
| WO | WO 94/06225 | 3/1994 |

* cited by examiner

SIGNAL RELAY APPARATUS OF OPTICAL COMMUNICATION SYSTEM

TECHNICAL FIELD

The present invention relates to a signal relay apparatus of an optical communication system in which a plurality of electronic equipments are disposed in a vehicle and the electronic equipments are connected to each other through optical transmission lines.

BACKGROUND ART

As a data transmission system for transmitting data in a vehicle, there is a known system in which an optical fiber cable is disposed in the vehicle, and non-time-series data such as a command and time-series data such as video data are transmitted using the optical fiber cable.

In the data transmission system, there is a synchronous ring type network for the purpose of transmitting time-series audio data, video data and the like. In the synchronous ring type network, as shown in FIG. 1, communication devices each comprising a master device and slave devices are connected to one another in a ring-like form, and data is transmitted in synchronization with data transmission timing between the communication devices.

In such a synchronous ring type network, as shown in FIG. 2 for example, electronic equipments A, B and C are disposed in a front portion of a vehicle near a front seat, and electronic equipments D and E are disposed near a rear seat. The electronic equipments are connected to one another in a ring-like form through optical communication lines 101 comprising optical fiber, and transmit data while relaying an optical signal in a predetermined direction. A power source line 102 is disposed in this synchronous ring type network. The power source line 102 comprises electric wire for supplying power source to each electronic equipment. The power source line 102 has a wire harness separately from the optical communication line 101. The reason why the optical communication line 101 and the power source line 102 utilize the different wire harnesses is that the optical communication lines 101 are connected in a ring-like form but the power source line 102 is branched off at each electronic equipment to which power source is supplied.

According to the synchronous ring type network, when all the electronic equipments are actuated and communication is started, it is necessary to carry out a wake-up processing for individually actuating the electronic equipments. However, in the conventional synchronous ring type network, photoelectric converters (FOT) provided in the electronic equipments are brought into standby states, and optical signal is sent to the slave devices A, B and C from the master device in this order, thereby waking them up. Thus, dark current (standby current) for bringing the electronic equipments in standby states is generated.

DISCLOSURE OF INVENTION

It is an object of the present invention to provide a signal relay apparatus of an optical communication system capable of suppressing dark current of electronic equipments constituting a ring type network.

In a signal relay apparatus in an optical communication system of this invention, a plurality of electronic equipments are connected to one another in a ring-like form, and each the electronic equipment relays an optical signal using an optical transmission line. The signal relay apparatus comprises a plurality of photoelectric converting units which are provided in correspondence with the electronic equipments, each of which converts an optical signal received from the corresponding electronic equipment into an electric signal and outputs the same to another photoelectric converting unit, and converts an electric signal input from other photoelectric converting unit into an optical signal and outputs the same to the corresponding electronic equipment, a plurality of switch circuits which are provided in electric signal input and output ends of each of the photoelectric converting unit, and which are opened and closed to bypass an electric signal from adjacent photoelectric converting unit, and power source supply control apparatuses which are provided in correspondence with the photoelectric converting units, and which supply power sources to the electronic equipments which are connected to the photoelectric converting units.

In the signal relay apparatus, when the electronic equipment connected to each the photoelectric converting unit is not used, each the switch circuit bypasses the electric signal from the adjacent photoelectric converting unit, and each the power source supply control apparatus stops the supply of the power source to the electronic equipment. With this structure, the network can be secured and in this state, it is unnecessary to supply the standby current to all of the connected electronic equipments, and it is possible to suppress the dark current to the electronic equipment.

BEST MODE FOR CARRYING OUT THE INVENTION

An embodiment of the present invention will be explained with reference to the drawings.

Figure 1:
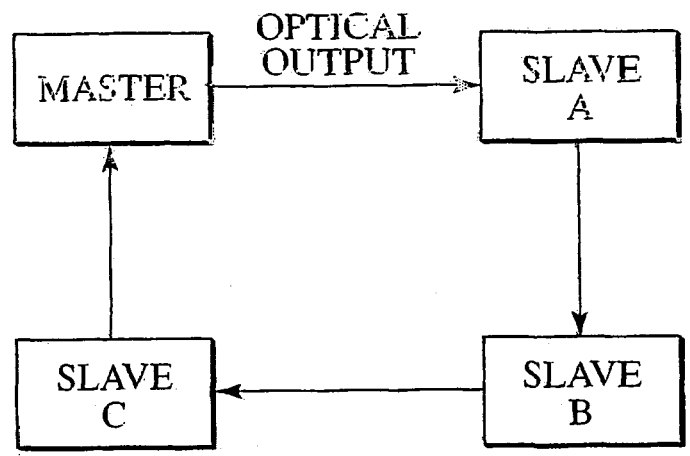
FIG. 1 is a block diagram showing a structure of a conventional optical communication system.
Figure 2:
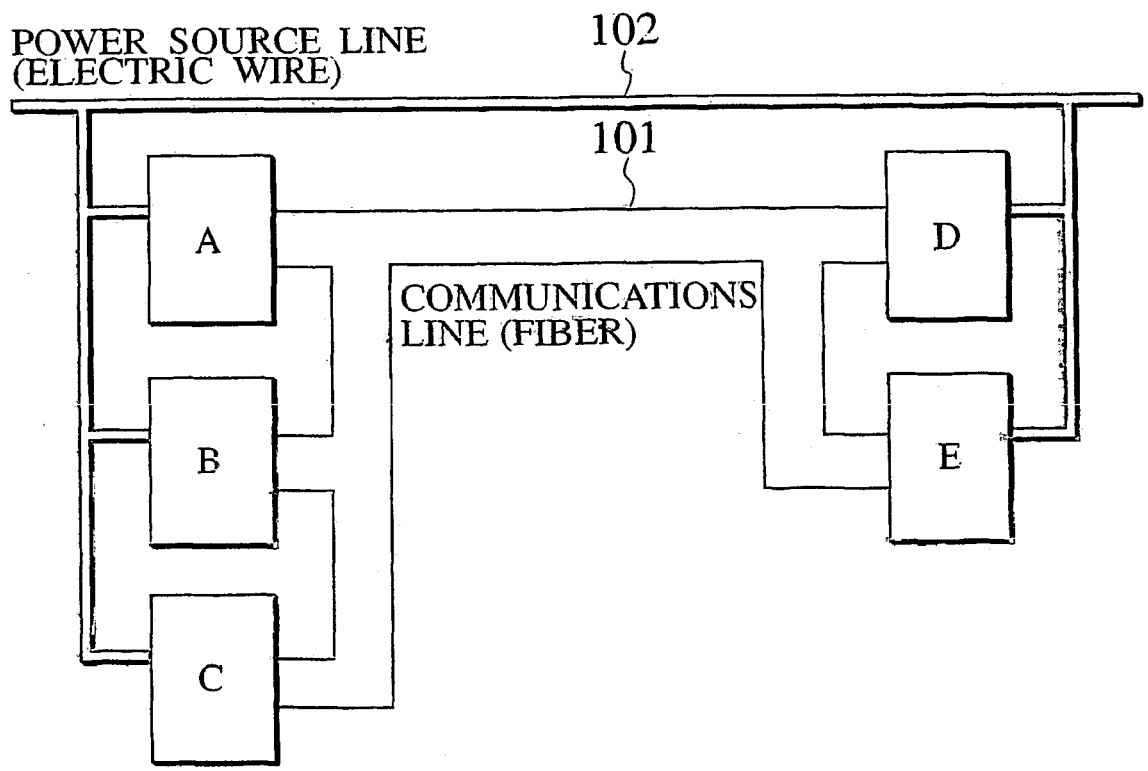
FIG. 2 is a view for explaining a wake-up processing by means of an optical signal in the conventional optical communication system.
Figure 3:
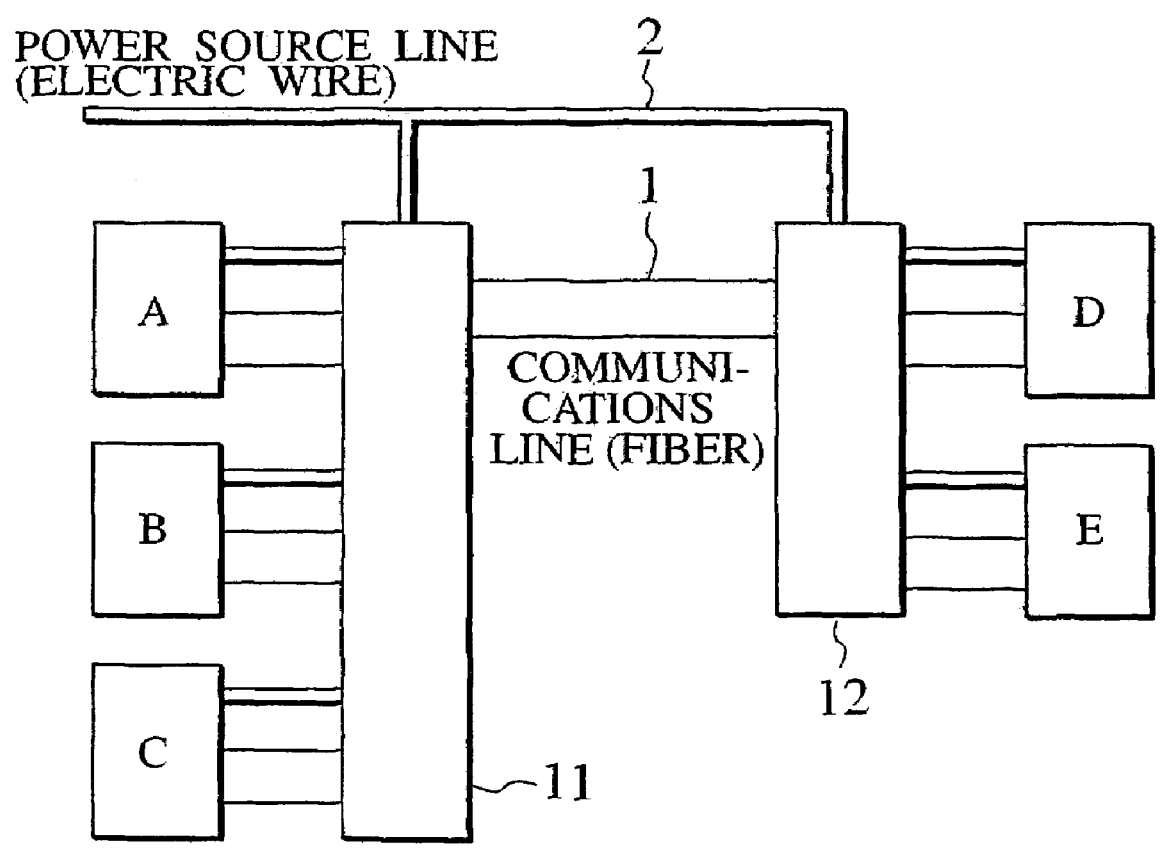
FIG. 3 is a block diagram showing a structure of an optical communication system to which the present invention is applied.

The present invention is applied to an optical communication system constituted as shown in FIG. 3.

According to this optical communication system for example, electronic equipments A, B and C are disposed in a front portion of a vehicle and near a front seat, and electronic equipments D and E are disposed near a rear seat. The vehicle having the optical communication system is provided with a first J/B (junction block) 11 located between the front seat and the rear seat, and with a second J/B 12 between the rear seat and a trunk room due to a reason of the structure or a reason of electric wiring.

In the optical communication system, the first J/B 11 and the second J/B 12, as well as the first J/B 11, the second J/B 12 and the electronic equipments A to E are connected to one another through optical communication lines 1 comprising fibers for sending optical signal therebetween. In the optical communication system, the first J/B 11, the second J/B 12 and the electronic equipments A to E are connected to a power source through a power source line 2. The first J/B 11 and the second J/B 12 are connected to each other through harnesses in which other control wire is integrated and the optical communication line 1 is accommodated in the harness. The first J/B 11 and the second J/B, 12 are connected to each other through the electronic equipments A to E and the power source line 2 so that electricity can be supplied.

In the optical communication system, the electronic equipments A to E are connected to one another in a ring-like form through the first J/B 11, the second J/B 12 and the optical communication line 1. The electronic equipments A to E relay optical signal between the adjacent electronic equipments in synchronization so that the optical signal is relayed to the electronic equipment A, the electronic equipment D, the electronic equipment E, the electronic equipment C, the electronic equipment B and the electronic equipment A in this order. At that time, the electronic equipments A to E carry out a signal synchronization processing in accordance with a communication protocol which is previously defined in the optical communication system. Each of the electronic equipments A to E adds an address of a destination electronic equipment and sends the optical signal, and if the former electronic equipment receives the optical signal from adjacent electronic equipment and if the destination of the optical signal is its own electronic equipment, the former electronic equipment receives the optical signal as it is. If the destination of the optical signal is not the own electronic equipment, the former electronic equipment relays the optical signal to adjacent electronic equipment.

[First Example of Structure of First J/E 11 and Second J/B 12]

Next, structures of the first J/B 11 and the second J/B 12 will be explained.

Figure 4:
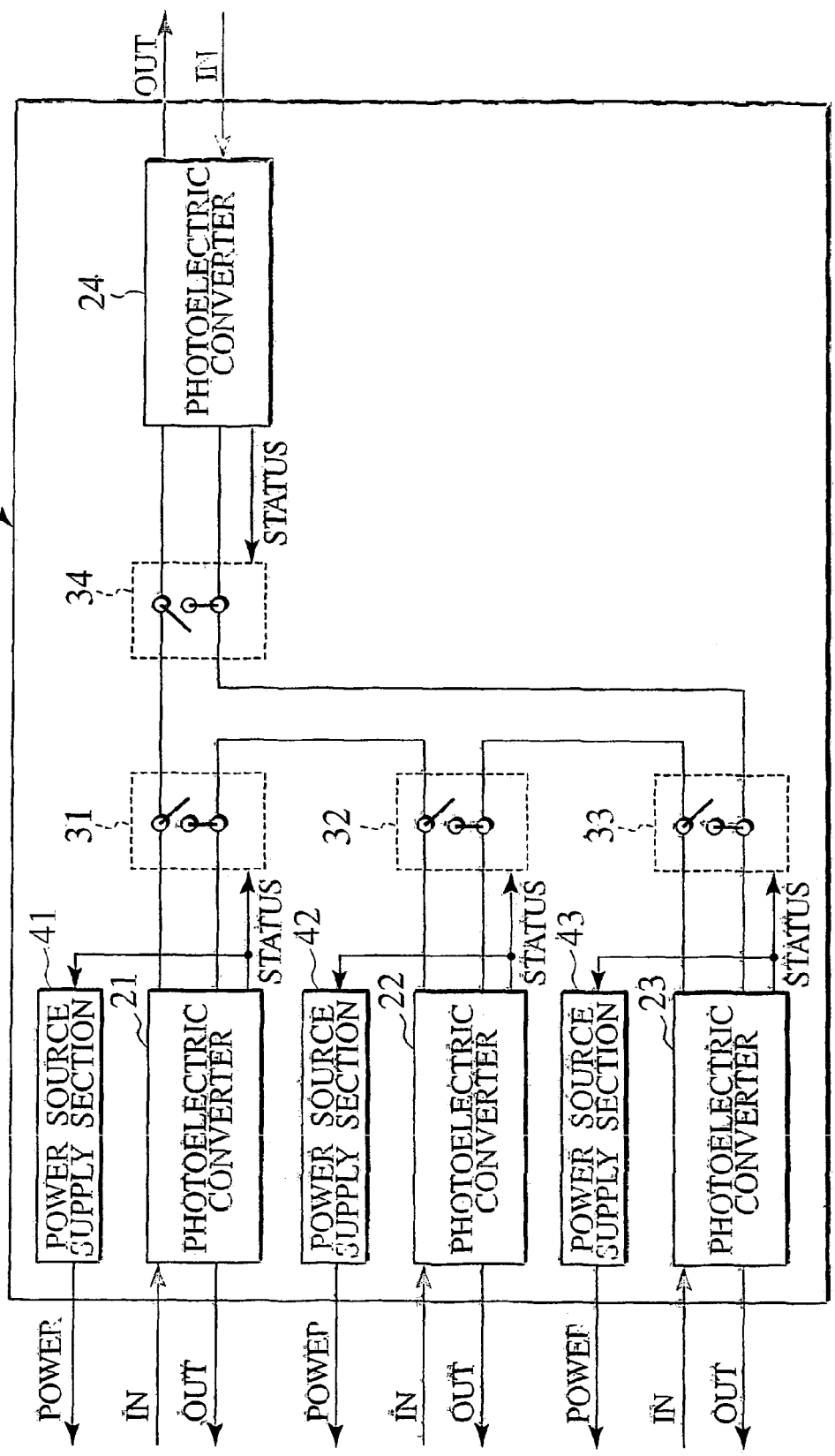
FIG. 4 is a block diagram showing an internal structure of a J/B, which constitutes the optical communication system to which the present invention is applied.

As shown in FIG. 4, the first J/B 11 includes a first photoelectric converter 21 connected to the first J/B 11 through the electronic equipment A and the optical communication line 1, a second photoelectric converter 22 connected to the first J/B 11 through the electronic equipment B and the optical communication line 1, a third photoelectric converter 23 connected to the first J/B 11 through the electronic equipment C and the optical communication line 1, and a fourth photoelectric converter 24 connected to the first J/B 11 through the second J/B 12 and the optical communication line 1. In the first J/B 11, the fourth photoelectric converter 24 and the third photoelectric converter 23 are electrically connected to each other, the third photoelectric converter 23 and the second photoelectric converter 22 are electrically connected to each other, the second photoelectric converter 22 and the first photoelectric converter 21 are electrically connected to each other, and the first photoelectric converter 21 and the fourth photoelectric converter 24 are electrically connected to each other.

In this first J/B 11, the fourth photoelectric converter 24, the third photoelectric converter 23, the electronic equipment C, the second photoelectric converter 22, the electronic equipment B, the first photoelectric converter 21 and the electronic equipment A are connected to one another in a ring-like form. In this first J/B 11, if an optical signal is input to the fourth photoelectric converter 24, the signal is relayed to the third photoelectric converter 23, the electronic equipment C, the third photoelectric converter 23, the second photoelectric converter 22, the electronic equipment B, the second photoelectric converter 22, the first photoelectric converter 21, the electronic equipment A, the first photoelectric converter 21 and the fourth photoelectric converter 24 in this order.

The first J/B 11 is provided with a first switch circuit 31, a second switch circuit 32, a third switch circuit 33 and a fourth switch circuit 34. These switch circuits 31 to 34 are provided on the input and output sides of the signal of photoelectric converters 21 to 24. The switch circuits 31 to 34 have functions to bypass and relay an electric signal from adjacent photoelectric converter.

Opening and closing operations of the first to fourth switch circuits 31 to 34 are respectively controlled by status judging signals (status) from the corresponding first to fourth photoelectric converters 21 to 24.

In each of the photoelectric converters 21 to 24, if an optical signal is input from the electronic equipment or the second J/B 12, an electric signal whose level is changed in accordance with change of optical signal level is generated and the electric signal is sent to the switch circuits 31 to 34. At that time, in the photoelectric converters 21 to 24, the level of the received optical signal is monitored, and if it is judged that an optical signal having stable constant level or higher is input, it is judged that a normal optical signal is input, a status judging signal (status signal) of L (Low) level is generated and is sent to the switch circuits 31 to 34. In the photoelectric converters 21 to 24, if it is judged that a stable optical signal of constant level or higher is not input, it is judged that a normal optical signal is not input, a status judging signal of H (Hi) level is generated and is sent to the switch circuits 31 to 34.

When a status judging signal of H level is sent to one of the switch circuits 31 to 34, the one of the switch circuits is closed. The electronic equipments A to C and the second J/B 12 are optically connected to the photoelectric converters 21 to 24, respectively. However, by the closed switch circuit, an electric signal from an adjacent photoelectric converter is not sent to a photoelectric converter corresponding to the closed switch circuit (the photoelectric converter is bypassed) and the signal is sent to another adjacent photoelectric converter. When a status judging signal of L level is sent, each of the switch circuits 31 to 34 is opened. By the opened switch circuits 31 to 34, an electric signal from an adjacent photoelectric converter is sent to the photoelectric converters, respectively.

By controlling the opening and closing operations of the switch circuits 31 to 34 in this manner, when breakage is generated in the optical communication line 1 between the first J/B 11 and the second J/B 12 or when breakage is generated between the electronic equipment and the first J/B 11 and the second J/B 12, or when the electronic equipment is out of order and an optical signal can not be relayed, the switch circuits 31 to 34 are closed the optical signal is allowed to bypass the breakage, thereby securing the ring network.

The first J/B 11 includes a first power source supply section 41, a second power source supply section 42 and a third power source supply section 43 which control supply of power source to the electronic equipments A to C. The power source supply sections 41 to 43 are provided in signal lines through which status judging signals are sent to the switch circuits 31 to 33 from the photoelectric converters 21 to 23.

The power source supply sections 41 to 43 are connected to the power supply line 2 and to the electronic equipments A to C. The power source supply sections 41 to 43 detect status judging signals supplied from the photoelectric converters 21 to 23 to the switch circuits 31 to 33, and recognize levels of the status judging signals. In an initial status immediately after the first J/B 11 is actuated, the power source supply sections 41 to 43 are brought into statuses in which power sources are supplied to the electronic equipments A to C. When the level of the status judging signal is H level, it is judged that the electronic equipments A to C are not connected to the photoelectric converters 21 to 23, and the supply of power source to the electronic equipments A to C from the power supply line 2 is stopped.

Although an internal structure of the second J/B 12 is not illustrated in the drawings, the second J/B 12 comprises the photoelectric converter, the switch circuit and the power source supply section corresponding to the electronic equipment D, the photoelectric converter, the switch circuit and the power source supply section corresponding to the electronic equipment E, and the photoelectric converter and the switch circuit for communicating between the second J/B 12 and the first J/B 11. The second J/B 12 is operated in the same manner as the first J/B 11.

[Power Source Management Processing of Optical Communication System]

Figure 5:
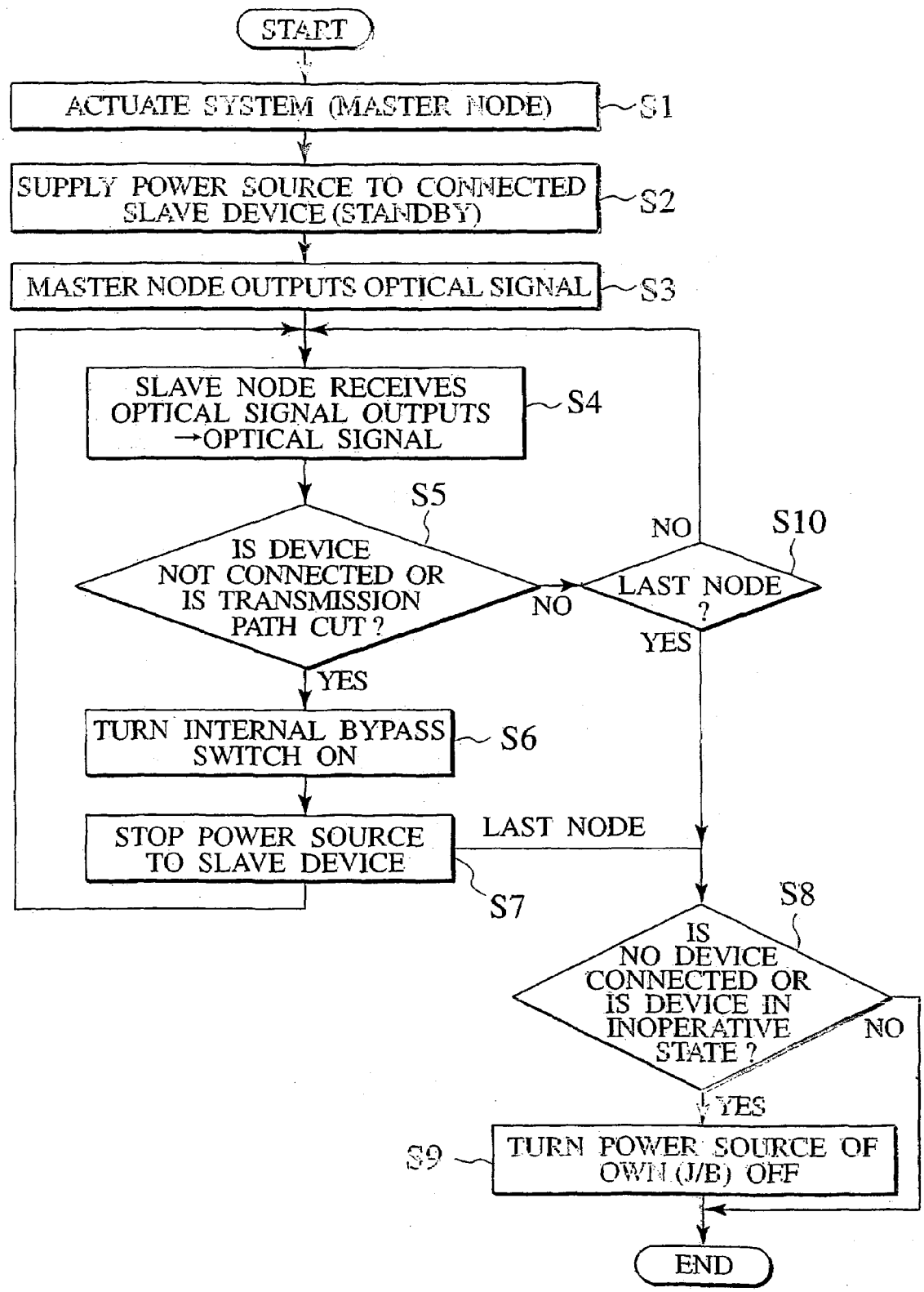
FIG. 5 is a flowchart showing processing procedure of power source management processing in the optical communication system to which the present invention is applied.

In the optical communication system having the first J/B 11 and the second J/B 12, the power source management processing with respect to the electronic equipments A to E will be explained with reference to the flowchart shown in FIG. 5. The processing will be explained based on a case in which anyone of the electronic equipments A to E functions as a master node which control the actuation of other electronic equipments, and the electronic equipment other than the master node are slave nodes. In the following explanation, since the first J/B 11 and the second J/B 12 have the same structures, the first J/B 11 and the second J/B 12 are collectively called "J/B".

First, if an actuation command is input to the master node by user's operation, the master node's actuated (step S1), and power source supply sections corresponding to the electronic equipments are controlled such that a power source is supplied to the slave nodes (slave devices) connected to each other through the optical communication line 1 and the J/B (step S2). With this step, the electronic equipments are brought into standby statuses for relaying an optical signal which is to be supplied later to establish the communication.

Next, the master node outputs the optical signal through the J/B and the optical communication line 1 (step S3). With this step, the optical signal is transmitted in a ring-like form through the optical communication line 1 and the photoelectric converters and the switch circuits in the J/B, and the relaying operation is started between the electronic equipments (step S4). Here, the switch circuits are opened at the time of actuation of the system.

Next, in the optical communication system, when the electronic equipment is not connected to the photoelectric converter, or when breakage is generated in the optical communication line 1 (step S5), a status judging signal of H level is supplied to each of the switch circuits to close the switch circuits (step S6), and supply of power source to the destination electronic equipment whose optical communication line 1 is not broken or to the photoelectric converter with which the electronic equipment is not connected is stopped (step S7). On the other hand, when the electronic equipment is connected to the photoelectric converter and breakage is not generated in the optical communication line 1 (step S5) or when it is not the last node, the processing is proceeded to step S4, and it is the last node, the processing is proceeded to step S8.

In step S8, it is judged whether there exists an electronic equipment which is connected to the first J/B 11 or second J/B 12 by the master node or whether all of the connected electronic equipments are inoperative state. In such a case, the supply of the power source to the first J/B 11 or second J/B 12 is stopped. That is, standby current to the photoelectric converter included in the first J/B 11 or second J/B 12 is also stopped.

[Effect of the Embodiment]

As described above in detail, according to the optical communication system to which the present invention is applied, the third switch circuit 33 is closed when the electronic equipment C of the electronic equipments A to C which is connected to the first J/B 11 is in the inoperative state or when the electronic equipment C is not used, and the supply of power source from the third power source supply section 43 to the electronic equipment C is stopped.

Therefore, according to the optical communication system, the ring network can be secured and in this state, it is unnecessary to supply the standby current to all of the connected electronic equipments, and dark current to the electronic equipments can be suppressed. Especially, according to the optical communication system, as the number of electronic equipments which constitute the ring network is greater, the number of electronic equipments which suppress the dark current is increased and more remarkably effect can be exhibited. When the power source used in a vehicle or the like is limited as compared with a home, remarkable effect can be exhibited.

According to the optical communication system, as shown in FIG. 3, when the electronic equipment C of the electronic equipments A to C connected to the first J/B 11 is in the inoperative state or is not used, the third switch circuit 33 is closed and the standby current to be supplied to the third photoelectric converter 23 corresponding to the electronic equipment C can be stopped. Thus, according to the optical communication system, the ring network can be secured and in this state, it is unnecessary to supply the standby current to all of the connected electronic equipments, and dark current to the electronic equipments can be suppressed.

Further, according to the optical communication system, as shown in FIG. 3, when all of the electronic equipments (D, E) of the electronic equipments D, E connected to the second J/B 12 are not connected or not used, the supply of power source to the second J/B 12 itself is stopped and the fourth switch circuit 34 of the first J/B 11 is closed. With this feature, consumption electricity of the second J/B 12 itself can be eliminated while securing the ring network.

The above embodiment is one example of the present invention. Thus, the present invention should not be limited to the embodiment, and it is of course possible to variously change the invention in accordance with design within a range not departing from the technical idea of the invention even out of the embodiment.

INDUSTRIAL APPLICABILITY

In this signal relay apparatus, when the electronic equipment connected to each the photoelectric converting unit is not used, each the switch circuit bypasses the electric signal from the adjacent photoelectric converting unit, and each the power source supply control apparatus stops the supply of the power source to the electronic equipment. With this structure, the network can be secured and in this state, it is unnecessary to supply the standby current to all of the connected electronic equipments, and it is possible to suppress the dark current to the electronic equipment.

The invention claimed is:

1. A signal relay apparatus in an optical communication system in which a plurality of electronic equipments are connected to the signal relay apparatus and to one another in a ring-like form, and each of the electronic equipment relays an optical signal using an optical transmission line, comprising:

a plurality of photoelectric converting units which are provided in correspondence with the electronic equipments, each of which detects optical signals, converts an optical signal received from the corresponding electronic equipment into an electric signal, outputs the electric signal to another photoelectric converting unit, converts an electric signal input from other photoelectric converting unit into an optical signal and outputs the optical signal to the corresponding electronic equipment;

a plurality of switch circuits which are provided in electric signal input and output ends of each of the photoelectric converting unit, and which are opened and closed to bypass an electric signal from adjacent photoelectric converting unit; and power source supply control apparatuses which are provided in correspondence with the photoelectric converting units, and which supply power sources to the electronic equipments which are connected to the photoelectric converting units, wherein when the electronic equipment connected to each of the photoelectric converting unit is not used, each of the switch circuit bypasses the electric signal from the adjacent photoelectric converting unit, and each of the power source supply control apparatus stops the supply of the power source to the electronic equipment.

2. The signal relay apparatus according to claim 1, wherein when an electronic equipment connected to a photoelectric converting unit is not used, a switch circuit bypasses an electric signal from an adjacent photoelectric converting unit, and a power source supply control apparatus stops the supply of a power source to the corresponding photoelectric converting unit.

3. The signal relay apparatus according to claim 1 or 2, wherein when an optical signal is not detected by a photoelectric converting unit, a power source supply control apparatus stops the supply of the power source to the photoelectric converting unit.

4. A signal relay apparatus, wherein a plurality of signal relay apparatuses are connected to an optical communication system, a plurality of electronic equipments are connected to the signal relay apparatuses and to one another in a ring-like form, and when an electronic equipment is not connected to a signal relay apparatus, the supply of the power source to all of the photoelectric converting units constituting the signal relay apparatus is stopped; the signal relay apparatus comprising:

a plurality of photoelectric converting units which are provided in correspondence with the electronic equipments, each of which detects optical signals, converts an optical signal received from the corresponding electronic equipment into an electric signal, outputs the electric signal to another photoelectric converting unit, converts an electric signal input from other photoelectric converting unit into an optical signal and outputs the optical signal to the corresponding electronic equipment;

a plurality of switch circuits which are provided in electric signal input and output ends of each of the photoelectric converting unit, and which are opened and closed to bypass an electric signal from adjacent photoelectric converting unit; and power source supply control apparatuses which are provided in correspondence with the photoelectric converting units, which supply power sources to the electronic equipments which are connected to the photoelectric converting units, wherein when the electronic equipment connected to each of the photoelectric converting unit is not used, each of the switch circuit bypasses the electric signal from the adjacent photoelectric converting unit, and each of the power source supply control apparatus stops the supply of the power source to the electronic equipment.

* * * * *